(No Model.) 2 Sheets—Sheet 1.
J. BACHMAN.
REAPER, BINDER, AND HARVESTER.
No. 365,771. Patented July 5, 1887.
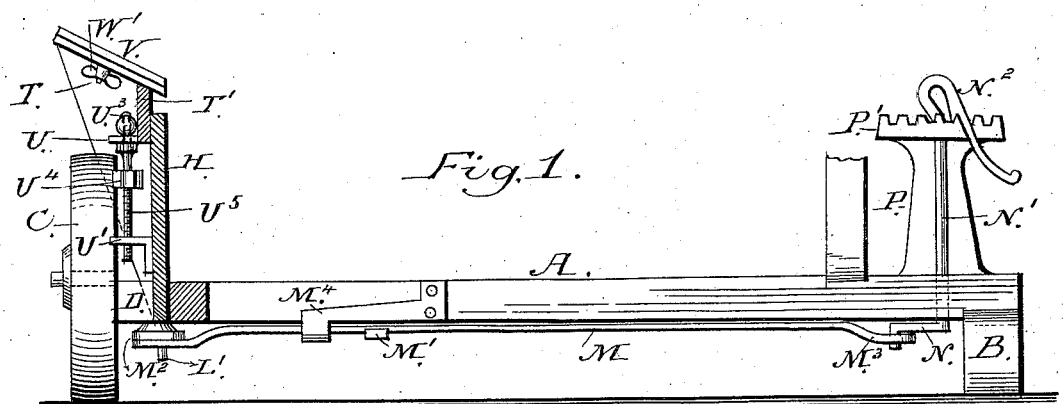
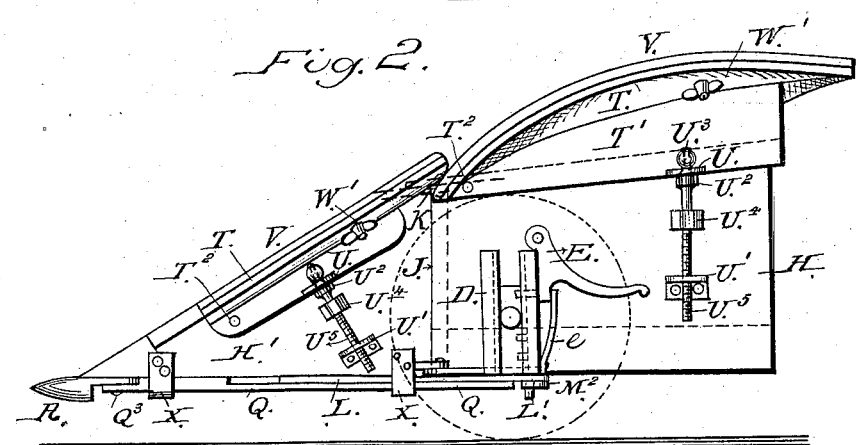
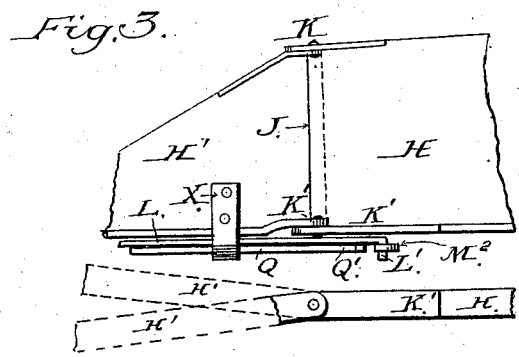
Witnesses:
T. N. Fowler
H. B. Applewhaite
Inventor
Jacob Bachman,
By his Attorney

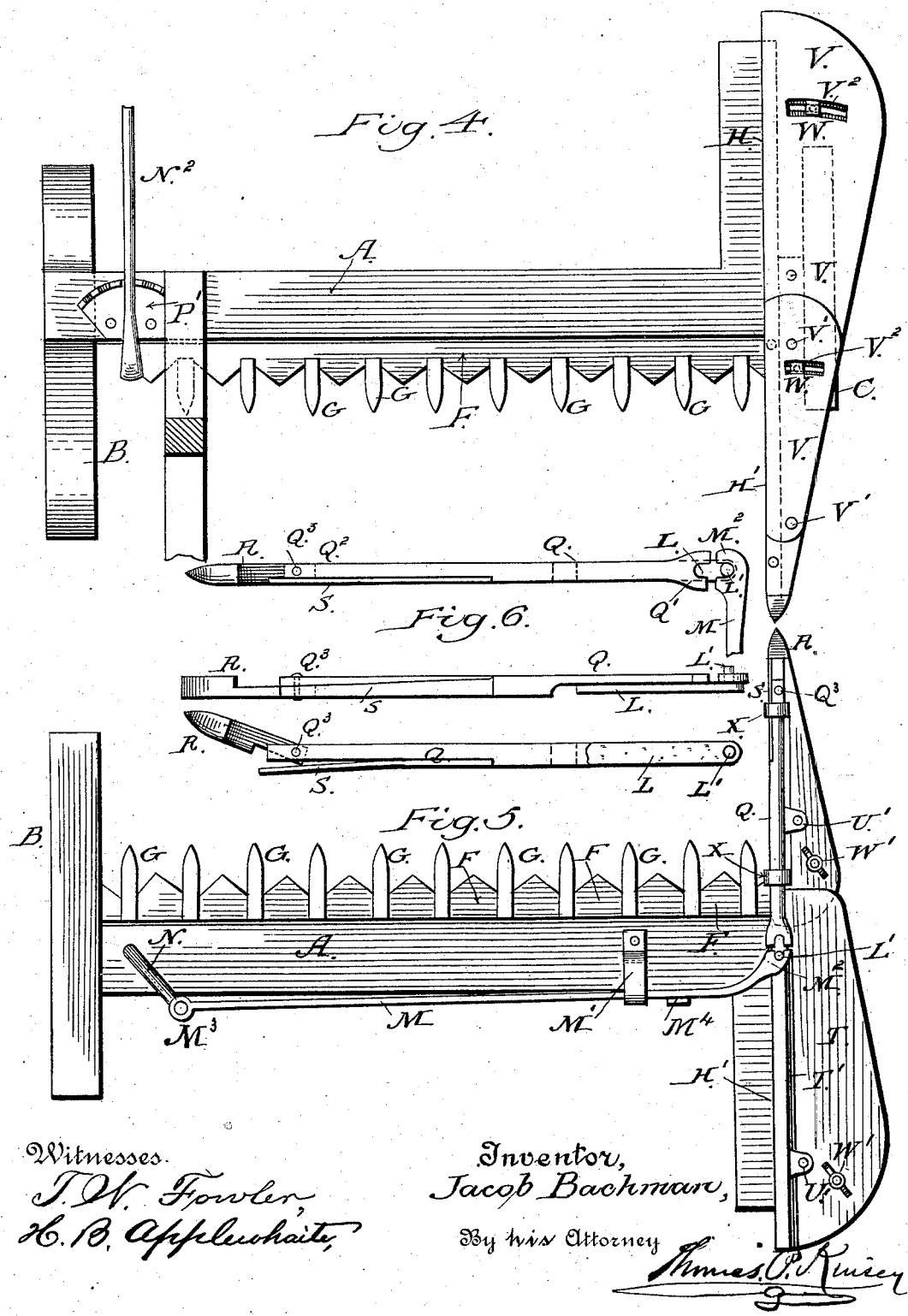

UNITED STATES PATENT OFFICE.

JACOB BACHMAN, OF STONY RUN, PENNSYLVANIA.

REAPER, BINDER, AND HARVESTER.

SPECIFICATION forming part of Letters Patent No. 365,771, dated July 5, 1887.

Application filed March 24, 1886. Serial No. 196,329. (No model.)

*To all whom it may concern:*

Be it known that I, JACOB BACHMAN, a citizen of the United States, residing at Stony Run, county of Berks, State of Pennsylvania, have invented a new and useful Improvement in Reapers, Binders, and Harvesters, of which the following is a specification.

This invention is related to the class of implements used for the purpose of cutting and harvesting standing crops of every class.

The object of the improvement is to produce a machine that will handle grain and other standing crops to better advantage, and while completely under the control of the operator will at the same time automatically turn itself out of the way to prevent breakage, and that will also admit of such adjustment of the divider-caps as will enable it to handle tangled, wet, or half-ripe grain.

It is well known to experts that in using a reaper, binder, or harvester upon a hill slope there is a constant tendency of the machine to slip down the slope, and the machine must be drawn at a greater or less angle with the line of traction to accommodate the same to the slip and prevent the crushing of a portion of the grain being cut.

By the adoption of my improvements the operator can instantly adjust the divider while in motion to adapt it to gather the grain properly to the cutter-bar, whether driving to the right or left upon a hill slope.

The drawings herewith show the nature of my improvement, and the readiness with which the same may be applied to any of the machines now in use, for the purpose described.

Similar letters of reference indicate similar parts throughout.

Figure 1 represents a rear end elevation and partial section of a reaper with my improvements attached, showing the pitman with its retaining-spring and the adjustment for the divider-caps; Fig. 2, an elevation of the outer divider with the grain-wheel removed, showing the vertical division of the same and the mode of vertically adjusting the divider-caps with the automatic finger-piece for safety at the nose of the divider. Fig. 3 represents a partial view of the divider upon an enlarged scale, showing the rearwardly-projected leverage bar, by which the front portion of the divider is operated by its connection with the pitman and the operating spring-lever. Fig. 4 is a top plan of the machine, showing the pivoting of the divider-caps for horizontal adjustment. Fig. 5 is a reverse plan showing the device for operating the movable front portion of the divider, also the finger-piece and releasing-bar, for automatically preventing the breakage of the same; Fig. 6, details of the pitman, releasing-bar, and safety finger-piece.

A represents the frame; B, the shoe; C, the grain-wheel; D, the wheel-box; E, the adjusting device for the height of the machine; F, the cutter-bar; G, the guards. H represents the rear portion of the divider.

The parts, as described, are all of the usual character.

My improvements will now be mentioned. First, I cut the divider vertically about at the point J, and connecting the front H' and rear portion, H, by suitably-formed hinges, K K'. If desired, the lower hinge-piece, K', may have an oblong slot for the pintle, so as to admit of the raising vertically of the forward end of the movable divider, and thus passing over light obstructions without strain. A leverage-bar, L, is secured beneath the portion H', and is projected rearward from the joint J, and is provided with a wrist-pin, L'. A pitman, M, supported in brackets M' to the rear of the cross-bar, has a bifurcated connection, $M^2$, with the wrist-pin L', and at the opposite end, $M^3$, a positive connection with a crank, N, of the vertical shaft N', the latter being supported by a stand, P, secured to the cross-bar and provided at the top with a quadrant notched plate, P'. The upper end of the shaft N' is provided with a spring-lever, $N^2$, by which the operator manipulates the movable portion H' of the divider, the notches in which the lever $N^2$ is dropped determining the position of the forward divider relative to the fixed portion of the same, the pitman being held in working-connection with the wrist-pin by a spring, $M^4$.

In the cutting of crops upon newly-cleared land obstructions of varying character are very frequently met, necessitating the stoppage of the machine, the dismounting of the operator, and the lifting of the machine out of the way; and it is not a rare occurrence to have the forward end of the divider strike against or into some hidden obstruction at the imminent risk of breaking the machine.

To meet the first case, where the obstructions are seen the driver seizes the lever N², and, operating the same, turns the nose of the divider to clear the obstruction, and the machine passes safely by. To meet the second case, I arrange a releasing-bar, Q, (in clips $x$,) beneath the forward divider, its rear portion resting against and sliding upon the leverage-bar L, and having its end Q' in contact with the bifurcated head M² of the pitman. The head Q' is bifurcated to catch the wrist-pin L', when forced in contact therewith. At the forward end, Q², a finger-piece, R, is pivoted at Q³. The finger-piece is held against all ordinary service force by a spring, S. This spring, when an unusual strain is brought to bear against R, permits the latter to turn outward upon its pivot Q³. At the same time the bar Q will be pressed rearward and the bifurcated head M² will be forced away from the wrist-pin L', and, being caught by Q', the same is released from the pitman, and the nose of the divider is at liberty to swing out of the way, and thus breakage is automatically prevented.

In cutting grain of various kinds—tangled, wet, or not fully ripe—it is important to be able to control the height of the divider-caps, as a slight change therein will make a great difference in the effective delivery of the material cut to the apron of the machine. This control I secure by pivoting the caps T to the sides of the dividers, having a bracket, T', attached to the caps for that purpose, as shown in section in Fig. 1, the pivot T² being provided to secure an adjustable and positive vertical movement at the rear ends of the same.

I attach to the brackets T' at suitable points ears U, and at suitable points on the dividers H H' ears U', the latter threaded for a screw. The screw bolts entering these are provided with fixed collars U² and loose rounded heads U³, a square or hexagonal portion, U⁴, and a threaded portion, U⁵. The upper end is inserted in the ear U, and the rounded head U³ is secured or riveted upon the end of the spindle above the collar U², or otherwise attached to it above the ear in any convenient manner. The rear of the cap is then raised until the threaded end of the screw will enter the ear U', when, turning the same by the portion U⁴, the screw will draw down the caps T until seated upon the dividers H H'. Subsequently they may be raised or adjusted to suit the requirements of the crop operated upon. It is also important to have the means of increasing or decreasing the width or plan of the divider-caps, as by such adjustment greater facility is given in the presentation of the cut material to the gatherer or rake operating over the apron. This control I also secure by a division of the caps T horizontally into two thicknesses, the lower portions being secured to brackets T' and pivoted at T² to the sides of the dividers. I pivot the upper thickness, V, of the caps at V' to the under thickness, T, and, to give the horizontal adjustment at a suitable distance from the pivot V', I form a segmental slot, V², in the pieces V, having recessed shoulders to the same. A bolt, W, having a flat head adapted to fill the space between the shoulders and lying flush with the face of the cap V, is projected through the under cap T, and being provided with a thumb-nut, W', the upper caps may be readily swung either side of the line of the lower caps or made coincident therewith and secured in the desired position by tightening the nut W'.

It is also desirable that the grain should more readily clear the divider-caps. To obtain this result over the usual flat-cap, I hump the rear divider-cap, as shown in Fig. 2. This causes the grain or cut material to fall naturally toward the apron, and is a feature of the improvements inaugurated by myself.

The details shown in Fig. 6 of the pitman, releasing-bar, and finger-piece will not need any further explanation to an expert.

The device for adjusting the height of the frame shown in Fig. 2 is one commonly used. It consists of a pivoted latch, E, which is pressed by a spring, $e$, against one of the guides D, between which the bearing-block which carries the wheel-axle is free to slide. A pin projects from the said latch, passes through a hole in the guide, and engages with recesses in the bearing-block, thereby holding it at the desired height above the ground. After the hinged divider has been automatically disengaged from its operating mechanism by striking some obstacle, the driver has to stop and replace the parts in operative connection by hand; but much less time is lost thereby than if the parts had been rigid and had been broken in the collision.

Having shown my improvements, described their use and advantages, I desire to secure by Letters Patent the following claims thereon:

1. The combination of a harvester-divider formed in two parts hinged together to permit of horizontal movement, a bar provided with a projecting pin secured to the movable portion of the divider and projecting behind it, a pitman-rod provided with a jaw, a spring for pressing the jaw over the said pin, and a hand-lever suitably connected to the said pitman-rod for operating it, substantially as and for the purpose set forth.

2. The combination of a harvester-divider formed in two parts hinged together to permit of horizontal movement, a bar provided with a projecting pin secured to the movable portion of the divider and projecting behind it, a pitman-rod provided with a jaw, a spring for pressing the jaw over the said pin, and a bar sliding in clips below the movable portion of the divider, and provided with a nose projecting in front of it and adapted to automatically disengage the said jaw from the pin when driven backward, substantially as and for the purpose set forth.

3. The combination of a harvester-divider formed in two parts hinged together to permit of horizontal movement, a bar provided with a projecting pin secured to the movable portion of the divider and projecting behind it, a pitman-rod provided with a jaw, a spring for pressing the jaw over the said pin, a bracket supporting the said pitman-rod parallel with the finger-bar, a crank engaging with the pitman-rod, and a spring-handle working over a toothed quadrant and connected to the crank for operating it, substantially as and for the purpose set forth.

4. The combination of a harvester-divider formed in two parts hinged together to permit of horizontal movement, a bar provided with a projecting pin secured to the movable portion of the divider and projecting behind it, a pitman-rod provided with a jaw, a spring for pressing the jaw over the said pin, a bar sliding in clips below the movable portion of the divider and adapted to automatically disengage the said jaw from the pin when driven backward, a nose pivoted to the said bar and projecting in front of the divider, and a spring secured to the bar and holding the nose in line with it until struck against an obstruction, substantially as and for the purpose set forth.

5. The combination of the divider, the divider-cap T, provided with flange T', pivoted to the divider, a screw-bolt journaled in a lug on the cap and engaging with a screw-threaded lug on the divider, and the upper part, V, pivoted to the cap T at one end and provided with a radial slot and a bolt at the other end for regulating its horizontal movement and securing it in position, substantially as and for the purpose set forth.

JACOB BACHMAN.

Witnesses:
AARON WISSLER,
WM. A. H. SCHMEHL.